United States Patent
Jaffe et al.

(10) Patent No.: US 12,360,043 B2
(45) Date of Patent: Jul. 15, 2025

(54) INTEGRATED FLUORESCENCE SCANNING SYSTEM

(71) Applicant: Lumencor, Inc., Beaverton, OR (US)

(72) Inventors: Claudia B. Jaffe, Portland, OR (US); Steven M. Jaffe, Portland, OR (US)

(73) Assignee: Lumencor, Inc., Beaverton, OR (US)

( * ) Notice: Subject to any disclaimer, the term of this patent is extended or adjusted under 35 U.S.C. 154(b) by 0 days.

(21) Appl. No.: 17/656,864

(22) Filed: Mar. 28, 2022

(65) Prior Publication Data

US 2022/0291129 A1  Sep. 15, 2022

Related U.S. Application Data

(63) Continuation of application No. 14/927,250, filed on Oct. 29, 2015, now abandoned.

(60) Provisional application No. 62/072,195, filed on Oct. 29, 2014.

(51) Int. Cl.
*G01N 21/64* (2006.01)

(52) U.S. Cl.
CPC ......... *G01N 21/6458* (2013.01); *G01N 21/64* (2013.01); *G01N 21/6452* (2013.01); *G01N 2021/6471* (2013.01)

(58) Field of Classification Search
CPC ........... G01N 21/6458; G01N 21/6452; G01N 21/64; G01N 2021/6471
See application file for complete search history.

(56) References Cited

U.S. PATENT DOCUMENTS

| | | | | |
|---|---|---|---|---|
| 5,266,271 A | * | 11/1993 | Bankert | G01N 31/22 422/82.07 |
| 6,408,767 B1 | * | 6/2002 | Binnard | F16C 29/025 108/147 |
| 2004/0022888 A1 | * | 2/2004 | Sreenivasan | B82Y 40/00 425/810 |
| 2005/0051723 A1 | * | 3/2005 | Neagle | C12M 41/48 250/306 |

FOREIGN PATENT DOCUMENTS

WO  WO-2007139201 A1 * 12/2007 ......... G01N 21/6458

* cited by examiner

*Primary Examiner* — Kiho Kim
(74) *Attorney, Agent, or Firm* — Psi Star Intellectual Property LLC

(57) ABSTRACT

An integrated fluorescence scanning system is provided. The integrated fluorescence scanner combines an embedded computer, light engine, microscope, and motion stage into a compact rack-mountable network appliance that allows for automation of fluorescence microscopy. In an embodiment, the integrated fluorescence scanner includes a solid-state light engine which can provide intense, pure, and stable light across the spectrum required for imaging of all fluorophores of interest. The embedded computer allows for autonomous operation, and network appliance features including synchronous multi-scanner operation and monitoring, multisite operation via a single control terminal, and calibration for inter and intra instrument consistency.

20 Claims, 12 Drawing Sheets

FIG. 3A
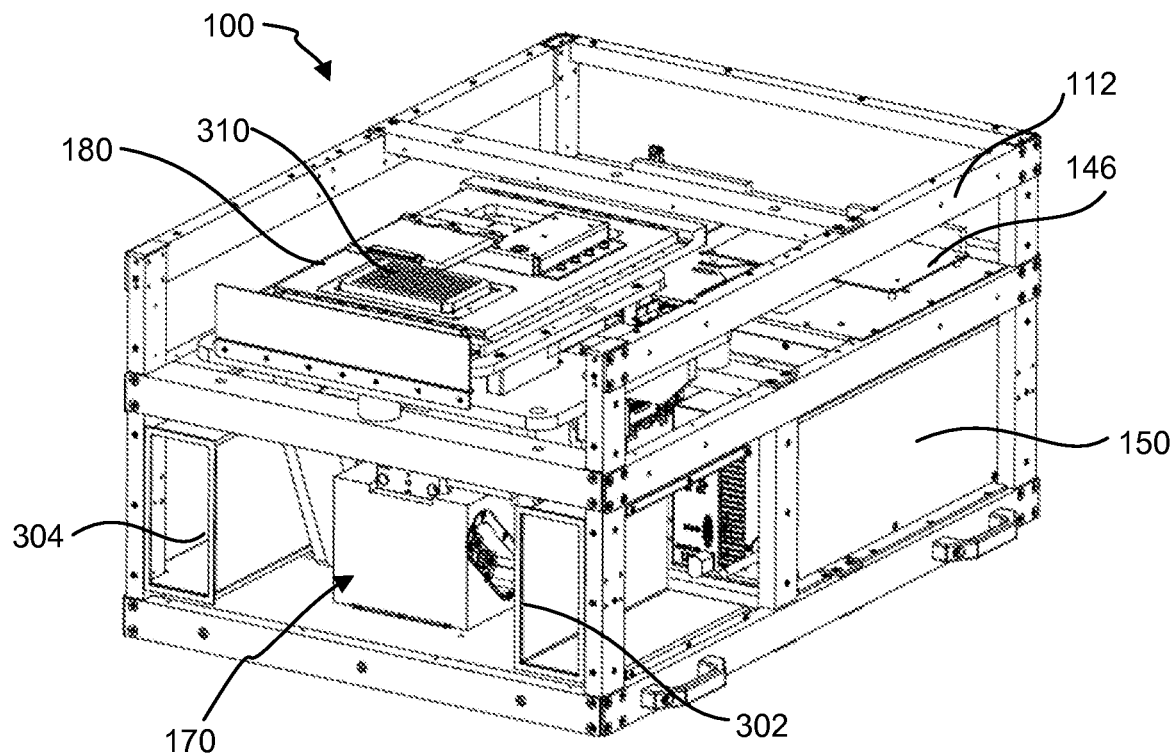
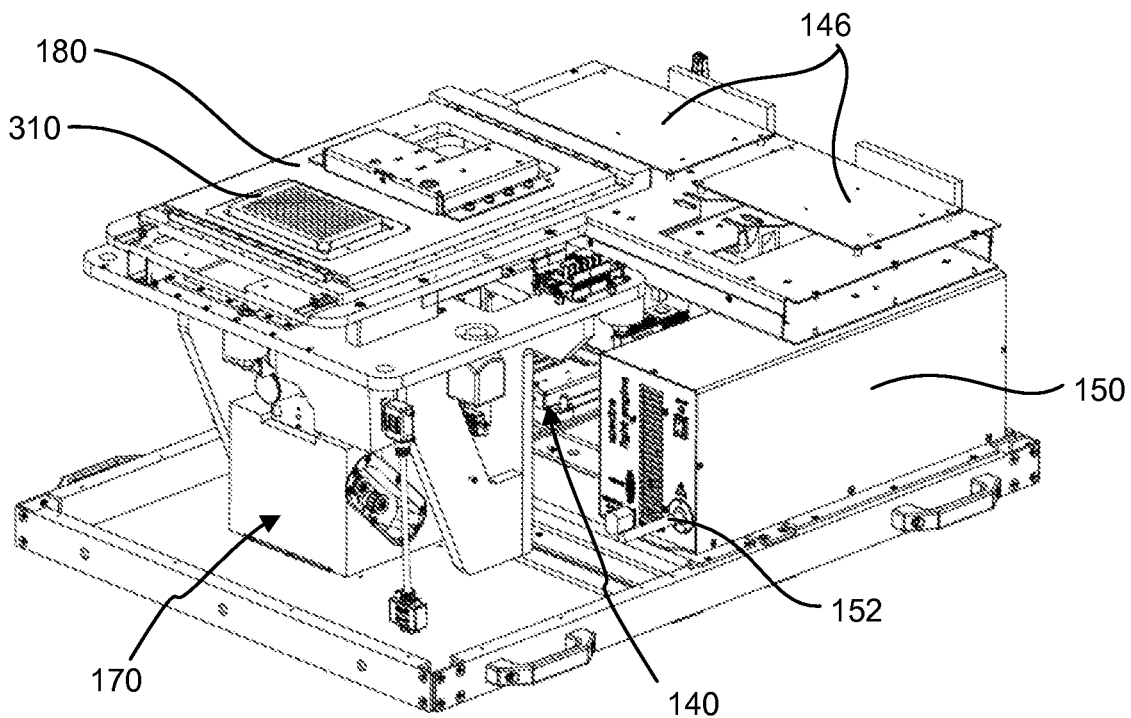
FIG. 3B

FIG. 4A
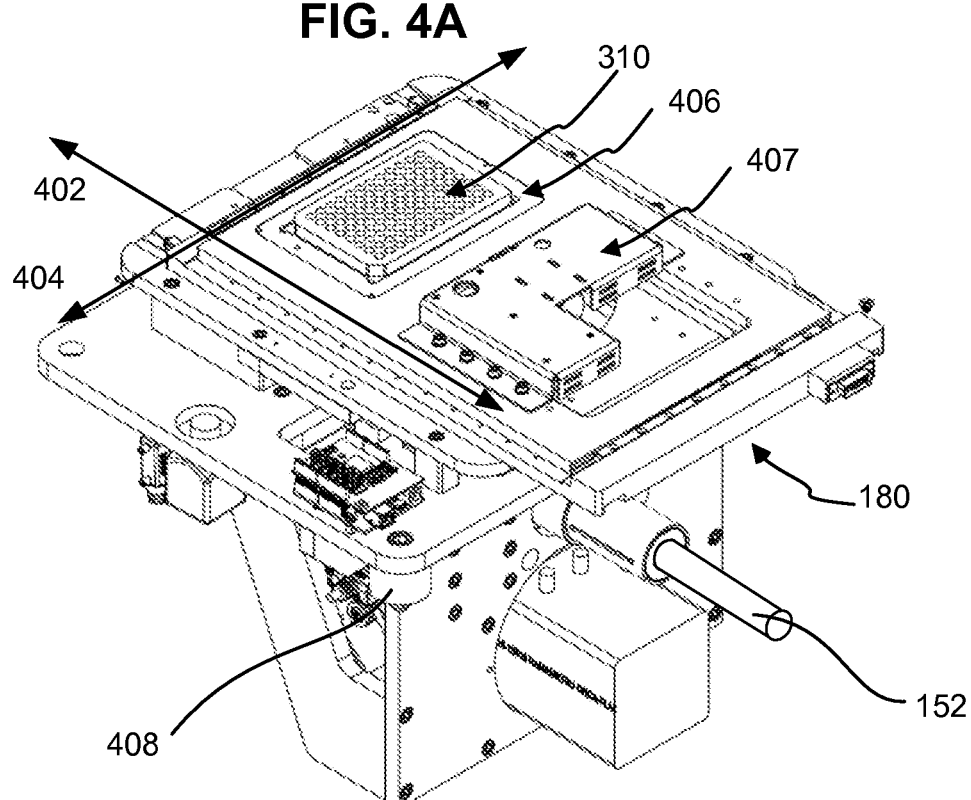
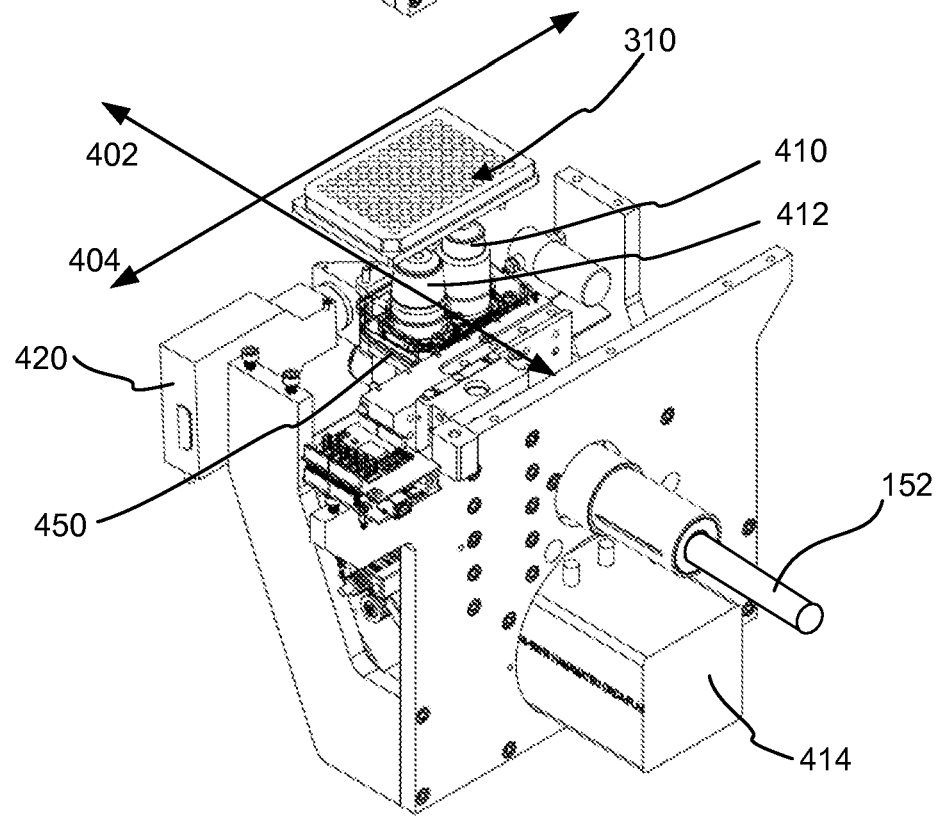
FIG. 4B

FIG. 5A
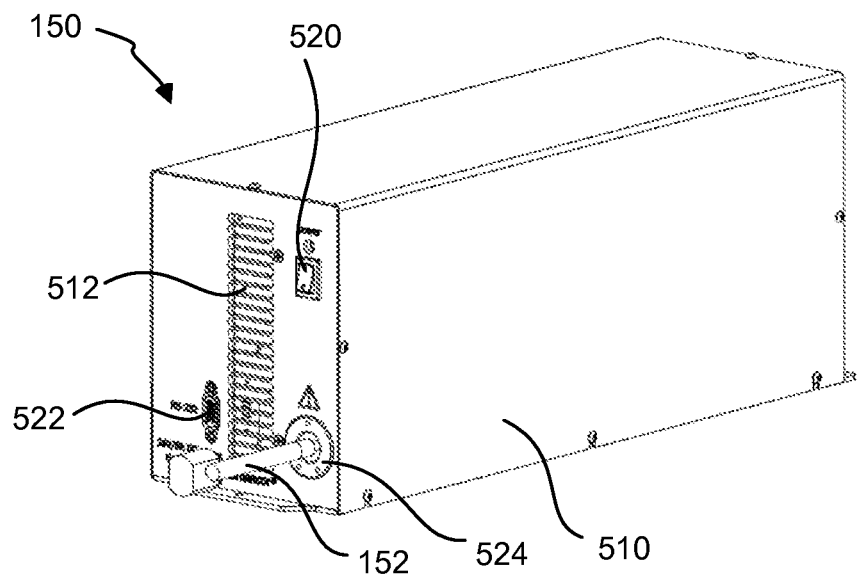
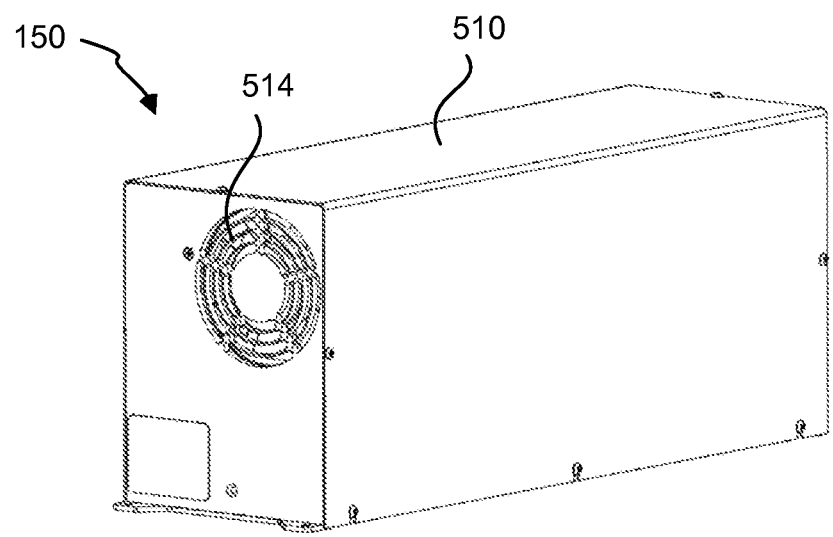
FIG. 5B

INTEGRATED FLUORESCENCE SCANNING SYSTEM

CLAIM OF PRIORITY

This application is a continuation of U.S. patent application Ser. No. 14/927,250, filed Oct. 29, 2015, which in turn claims the benefit to U.S. Provisional Patent Application Ser. No. 62/072,195, filed Oct. 29, 2014. Both applications are incorporated herein by reference in their entireties.

FIELD OF THE INVENTION

The present invention relates to a system and method for fluorescence scanning. In particular the present invention relates to an integrated fluorescence scanner featuring a solid state light source.

BACKGROUND OF THE INVENTION

Fluorescence microscopy utilizes an optical microscope configured to detect fluorescence and phosphorescence instead of or as well as reflection and absorption of light to study properties of specimens. In fluorescence microscopy, the specimen is illuminated with light of a specific wavelength an excitation filter or dichroic mirror is used to select the wavelength of light directed at the specimen. The excitation light excites fluorophores in the specimen causing the fluorophores to emit fluorescent light (usually at a longer wavelength). The fluorophores may occur naturally in the specimen or may be provided by staining or labelling the specimen with fluorophores. The emitted fluorescent light has a lower intensity than the excitation light and thus a spectral emission filter is used to block the excitation light but allow transmission of the fluorescent light to a detector such as a camera. Different combinations of excitation filters/dichroics and spectral emission filter are used dependent upon the characteristics of the fluorophore to be detected. Most fluorescence microscopes in use are epifluorescence microscopes, where excitation of the fluorophore and detection of the fluorescence are done through the same light path via the objective lens.

Fluorescence microscopy is useful for a wide range of applications including pathology, histology, microplate cytometry, and research. Fluorescence microscopy can be used to image slides of tissues, cells, tissue microarrays, microarrays, electrophoresis gels, western blots or microplates to image of detect fluorophores in the specimen.

Existing high throughput fluorescence microscopy instruments essentially comprises a fully featured microscope and other elements creating poorly integrated system which is an imperfect match for its intended use. The instruments typically offer all the degrees of freedom for analysis that are expected of a microscope, yet are superfluous for a dedicated scanner or reader while adding complexity and unnecessary failure modes and maintenance/setup requirements. Separate control systems and power supplies are utilized for the various components. Typically a dedicated local computer system is utilized to coordinate the multiple control systems. Also, the instruments utilize conventional lighting technologies such as arc lamps which have disadvantages such as spectral instability, short lifespan/high maintenance costs and high heat production.

SUMMARY OF THE INVENTION

The present invention provides an integrated fluorescence scanner which overcomes the disadvantages of prior scanning systems. The present invention provides an integrated fluorescence scanner which incorporates a light engine, microscopes, imaging devices, and motion control into a network appliance that allows for automation of fluorescence microscopy. In an embodiment, the integrated fluorescence scanner includes a solid-state light engine which can provide intense, pure, and stable light across the spectrum required for imaging fluorophores of interest. The powerful, solid state light engine affords shorter assay times, higher throughput and enhanced reproducibility, stability, signal/noise and robustness.

The integrated fluorescence scanner meets the needs of high throughput fluorescence microscopy with a pared down design that employs all the best features of a microscope, the efficiency and power of a solid state light engine and the fast design cycle and short time to market that most instrument manufacturers need. Equipped with an embedded computer, the novel server architecture of the integrated fluorescence scanner enables custom programming of scanning protocols, autonomous scanning operation, scanning via network oversight, and coordination of numerous integrated fluorescence scanning systems thereby enabling a systems approach to high throughput analysis.

In an embodiment, the present invention provides an integrated fluorescence scanner which combines an embedded computer server, light engine, microscope, and motion stage into a compact rack-mountable network appliance that allows for automation of fluorescence microscopy. In an embodiment, the integrated fluorescence scanner includes a solid-state light engine which can provide intense, pure, and stable light across the spectrum required for imaging of all fluorophores of interest. The integrated fluorescence scanner is self-contained in a stackable and/.or rack mountable housing which has a volume less than 2 cubic feet. This allows for space-efficient utilization of large numbers of integrated fluorescence scanning systems in a high throughput facility The embedded computer allows for synchronous multi-scanner operation and monitoring, multisite operation via a single control terminal, and calibration for inter and intra instrument consistency.

Other objects and advantages of the present invention will become apparent to those skilled in the art from the following description of the various embodiments, when read in light of the accompanying drawings.

BRIEF DESCRIPTION OF THE FIGURES

Various embodiments of the present invention can be described in detail based on the following figures, wherein:

FIGS. 3A-3C show partial perspective views of the integrated fluorescence scanner of FIGS. 1A-1C illustrating the arrangement of subsystems of the integrated fluorescence scanner according to an embodiment of the present invention;

FIGS. 4A-4C show partial perspective views of the scanner subassembly of the integrated fluorescence scanner of FIGS. 1A-1C according to an embodiment of the present invention;

FIGS. 5A-5D show views of the light engine subassembly of the integrated fluorescence scanner of FIGS. 1A-1C according to an embodiment of the present invention.

DETAILED DESCRIPTION OF THE INVENTION

Figure 1A:
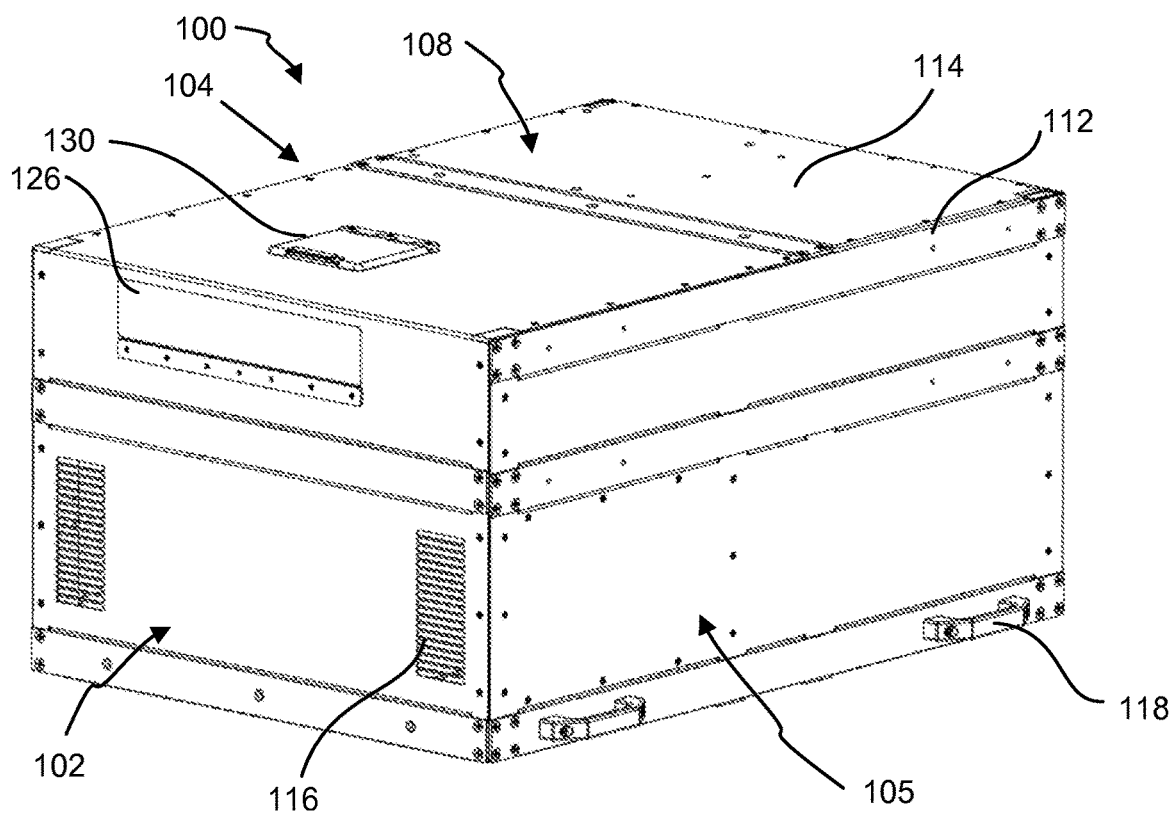
FIG. 1A shows a perspective view of an integrated fluorescence scanner according to an embodiment of the present invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention. Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

The present invention provides a fluorescence scanner which integrates a light engine, microscopes, imaging devices, a computer server, and motion control hardware into a network appliance that allows for automation of fluorescence microscopy. In an embodiment, the integrated fluorescence scanner includes a solid-state light engine which can provide intense, pure, and stable light across the spectrum required for imaging fluorophores of interest. The powerful, solid state light engine affords shorter assay times, higher throughput and enhanced reproducibility, stability, signal/noise and robustness.

High throughput scanning, imaging and screening require high performance instrumentation and quantitation. The integrated fluorescence scanner is tailored to include all the key hardware components to optimize fluorescence scanning, including solid state lighting, while eliminating extraneous hardware and costs associated with the traditional microscope. The integrated fluorescence scanner features a pared down design that employs all the best features of a microscope, the efficiency and power of a solid state light engine and the fast design cycle and short time to market that most instrument manufacturers need. Equipped with an embedded computer, the novel open architecture enables scanning via network oversight and coordination of numerous readers in a systems approach to high throughput analysis.

The integrated fluorescence scanner is a high throughput fluorescence reader or scanner that utilizes an integrated state-of-the-art, solid state light engine. The scanner is designed to support a wide variety of bioanalytical applications. The scanner is a highly integrated, dedicated scanner that can be tailored to the needs of a specific assay. The complete optical train is optimized for power, speed, spectral purity, and enhanced signal/noise for assays that are relevant to bioanalytical analysis. The advantages of the integrated fluorescence scanner include: smaller footprint, faster operation, reduced cost of manufacture and maintenance, real-time quantitation, high throughput operation, open software architecture and data acquisition, autonomous operation, network appliance capability, and programmable process control.

The integrated fluorescence scanner includes a rigid frame upon which hangs an epifluorescent microscope, autofocus system, a tube lens, multicolor solid-state light engine, XYZ stage motion, imaging system, and the collection optics to bring fluorescent signals to the camera. A modular chassis is stackable to allow multiple units for ultra-high throughput. The system is vibration-free avoiding the need for an air table. In an embodiment the system has a table top form factor 17 inch depth, 11 inch width, ×15 inch height for a total volume less than 2 cubic feet, and can be rack mounted with up to 3 units per rack. Additionally, the scanner allows optional robotic access for sample introduction for repeatable slide placement into the scanner and removal from the scanner for fully automated operation.

The epifluorescent microscope of the scanner includes microscope objective mounts to mount up to three objective lenses and is compatible with lenses from major manufacturers. A user can select and install objective lenses as need for particular scanning operations. The objective lenses may be installed and or changed by the user through an access door. Plan apo 4×, 20× & 63× and tube lenses are used. During operation of the system, a motorized objective changer allows for selection of which objective is used at a particular time in a scanning protocol under control of the embedded computer. A system provides automated oil application for the highest magnification objective lens. Manual oil refill and objective cleaning can be performed by the user. A hardware-based automated autofocus system focusses the objective lenses using reflection based hardware autofocus. Optical image based autofocus is also provided.

An automated filter block holder allows selection and changing of filters under control of the embedded computer during scanning operation. Multiple position dichroic/emission pairs are provided in a filter block holder. The filter blocks can be manually loaded during system configuration. A protocol switch allows change of dichroic/emitter pairs. An actuator under control of the embedded computer allows for selection of the filter block in use at any point in time in a protocol.

The motion stage is configured for holding four standard microscope slides or a micro plate. The motion stage moves the slides or microplate in two horizontal axes for scanning under control of the embedded computer. The motion stage can also move in and out of the scanner for introduction of new slides/microplates. In a fully automated facility, new slide/microplates can be loaded into the scanner by a robotic system.

The integrated fluorescence scanner can include a range of optional cameras for imaging the slides/microplates including Hamamatsu™, Andor™, QImaging™, Photometric™ brand cameras. The scanner provides for precision angular rotation: alignment of camera axis & stage motion. Programmed Light engine and camera triggering can be controlled under control of the embedded computer. A 15×15 mm area (70×70 fields) can be imaged in four color channels (e.g. defined by filter block selection). Auto IR reflective focus mechanism allows for <1% field loss, >200 nm out. The exposure rate can be 30-50 frames per second up to a potential output of 100 frames per second.

The integrated fluorescence scanner includes a solid state light engine which provides light to the microscope under control of the embedded computer. The light engine is swappable for repair, replacement of substitution with a light engine having different capabilities. The light engine provides as many as eight excitation colors with exchangeable filters including as many as seven UV Visible light color bands and one optional NIR band (near infra-red). The light engine also provides optional metered dosage closed loop control. A dosimetry option allows titration of photons per analysis (light as a reagent) and can be operated in constant power mode or constant flux mode. The light engine features an electronic shutter, ~5-20 μs pulse rise or fall times and a modulation rate up to 5 kHz. Advantageously, the solid state light engine has lower reduced cooling requirements than other light sources and can therefore be integrated in the modular housing of the scanner.

The embedded computer controls all systems of the integrated fluorescence scanner allowing for autonomous scanner operation, real-time, high throughput, imaging and scanning (no latencies). An Ethernet interface and cross platform drivers are provided for control software. Electronic and software handshakes enable remote monitoring and reproducible, robust multi-scanner operation. Numerous options are readily available to configure the scanner to particular applications. Software provides cross platform software interfaces for common 3rd party applications such as MicroManager™, MatLab™, etc. The embedded computer communicates with networked workstations which allow for monitoring operation of the scanner, as well as e.g. configuring scanning protocols.

A software development kit (SDK) is provided for the integrated fluorescence scanner. The SDK allows for development of custom control interfaces for particular uses of the scanner. The embedded computer provides a development interface for autonomous operation and remote control allowing scanner operation as a network appliance. The integrated fluorescence scanner facilitates synchronous multi-scanner operation and monitoring, robust, reproducible instrument/instrument and multisite operation via one control terminal with lights out factory operation. Automated calibration of scanners provides for inter and intra instrument consistency of scanning/imaging results.

Figure 1B:
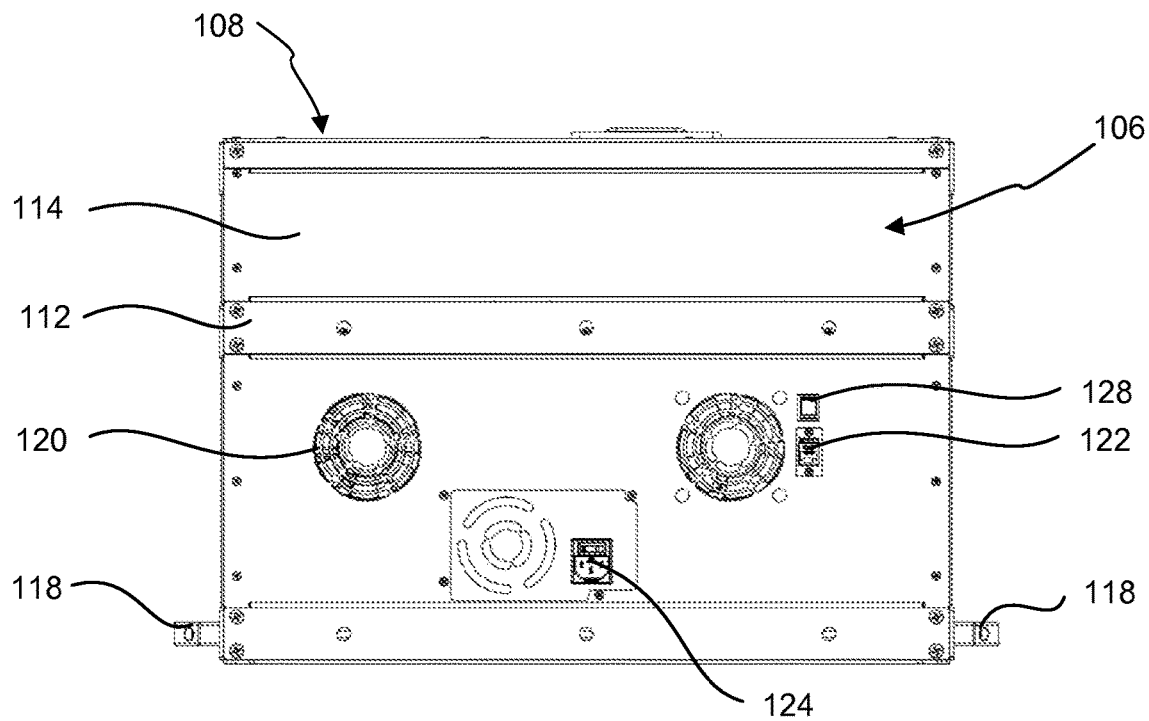
FIG. 1B shows a rear view of the integrated fluorescence scanner of FIG. 1A.
Figure 1C:
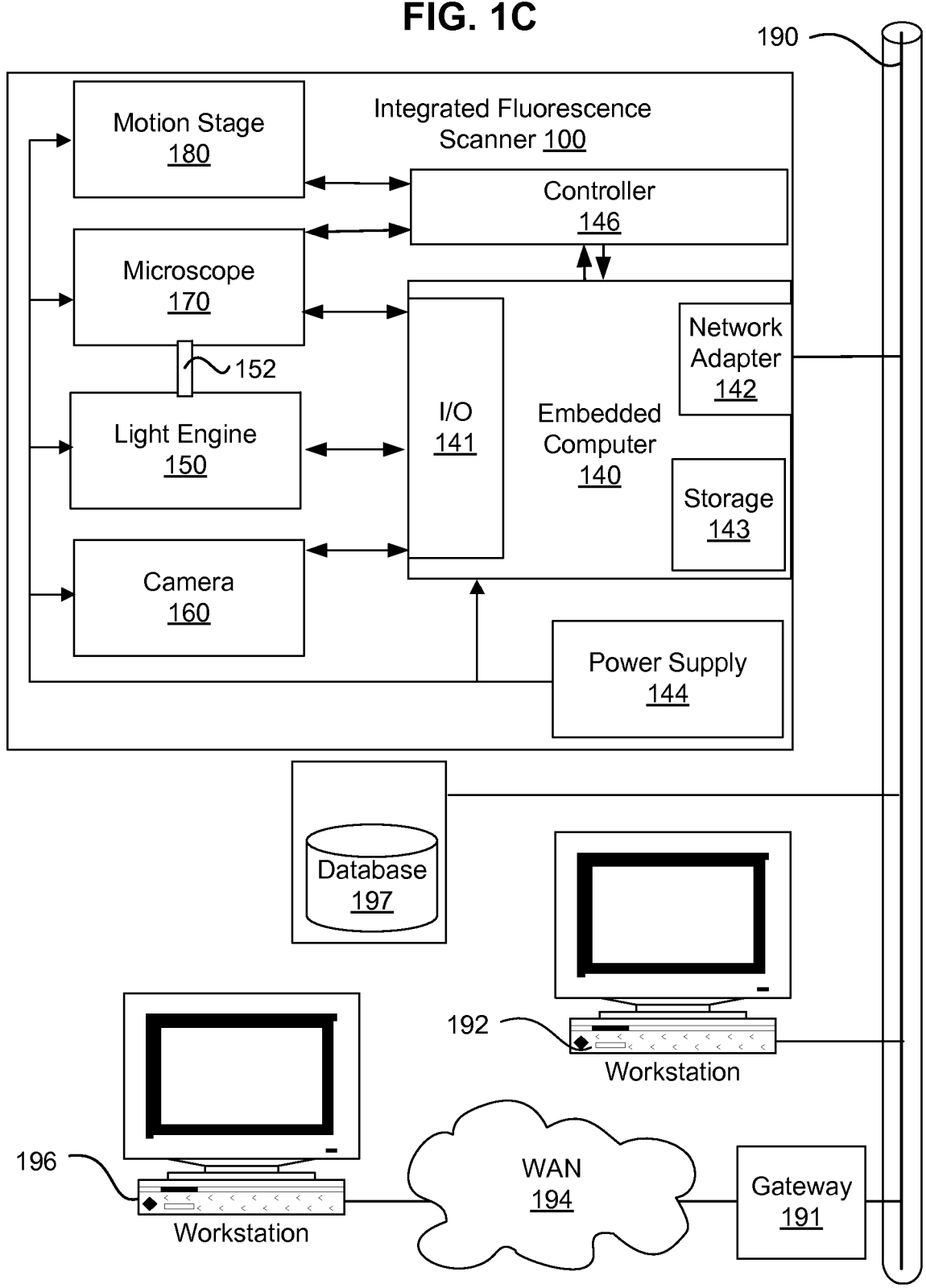
FIG. 1C shows a block diagram of the systems of the integrated fluorescence scanner of FIG. 1A.

FIGS. 1A-1C show views of an integrated fluorescence scanner 100 according to an embodiment of the present invention. FIG. 1A shows a perspective view of an integrated fluorescence scanner according to an embodiment of the present invention; FIG. 1B shows a rear view of the integrated fluorescence scanner of FIG. 1A; and FIG. 1C shows a block diagram of the systems of the integrated fluorescence scanner of FIG. 1A.

As shown in FIGS. 1A and 1B, integrated fluorescence scanner 100 the exterior of integrated fluorescence scanner 100 is generally box-shaped allowing integrated fluorescence scanner to be stacked or rack-mounted. The exterior comprises a stiff frame 112 covered with a plurality of panels 114. The front side 102 of integrated fluorescence scanner 100 has a specimen door 126 which opens to admit microplates, slides or other specimens. Front side 102 also includes intake air vents 116. The left and right sides 104, 105 have handles 118 to facilitate moving of integrated fluorescence scanner 100. On the rear side 106, integrated fluorescence scanner 100 has exhaust fan vents 120, a network connector 122, power connector 124 and an on/off/reset switch 128. On the top surface 108, integrated fluorescence scanner 100 has an access door 130 which allows access for servicing or changing lenses of the microscope.

FIG. 1C shows a block diagram of the systems of integrated fluorescence scanner 100 of FIG. 1A. As shown in FIG. 1C, integrated fluorescence scanner 100 includes a motion stage 180, microscope 170, camera 160, light engine 150, embedded computer 140 and a common power supply 144. Embedded computer 140 includes a microprocessor and memory and storage 143 which can comprise one or more hard disk, memory and/or flash storage device for storing an operating system, applications, and data. Embedded computer 140 includes high speed network interface adapter 142, storage 143 and one or more I/O adapters 141 for controlling and receiving data from microscope 170, camera 160, and light engine 150. Integrated fluorescence scanner 100 also includes a controller 146 connected to embedded computer 146. Controller 146 is responsible for driving motors and actuators of microscope 170 and motion stage 180 and includes electronics for driving e.g. stepper motors, servo motors, and other mechanical actuators.

The embedded computer 140 controls all systems of the integrated fluorescence scanner 100 allowing for autonomous scanner operation including real-time, high throughput imaging and scanning (no latencies). An Ethernet interface and cross platform drivers are provided for control software. Electronic and software handshakes enable remote monitoring and reproducible, robust multi-scanner operation. Numerous options are readily available to configure the scanner to particular applications. Software provides cross platform software interfaces for common 3rd party applications such as MicroManager™, MatLab™, etc.

A Software Development Kit (SDK) provided with the integrated fluorescence scanner 100 allows for development of custom control interfaces. The embedded computer 140 provides a development interface for autonomous operation and remote control allowing scanner operation as a network appliance. The integrated fluorescence scanner facilitates synchronous multi-scanner operation and monitoring, robust, reproducible instrument/instrument and multisite operation via one control terminal with lights out factory operation. Automated calibration is provided via embedded computer 140 for inter and intra instrument consistency of results.

As shown in FIG. 1C, integrated fluorescence scanner 100 is designed to be operated as a network appliance such that it can be connected to a network over which it receives configuration and scanning instructions and sends scanning results and performance data. Embedded computer 140 can be connected via a Local Area Network (LAN) 190 to a local workstation 192 or via LAN 190, gateway 191, and Wide Area Network (WAN) 194 (e.g. the Internet or a private WAN) to a remote workstation 196. Embedded computer 140 can also be connected via LAN 190 to a database 197 for storing configuration and control instructions as well as scanning results. Alternatively, or additionally, a database 197 on e.g. a database server can be used for storing configuration and control instructions as well as scanning results and can be connected via Wide Area Network (WAN) 194 and gateway 191 to LAN 190 (e.g. "cloud storage"). Software applications provided on workstations 192, 196 (as described below) allow users of workstations 192, 196 to configure integrated fluorescence scanner 100, control scanning operations of integrated fluorescence scanner 100, and view and analyze the scans produced by integrated fluorescence scanner 100 directly and/or via database 197.

Network Appliance

The integrated fluorescence scanner 100 can be operated as a network appliance controlled through a single Ethernet connection. The integrated fluorescence scanner 100 can be configured to run autonomously when executing protocols uploaded over the Ethernet connection. The integrated fluorescence scanner can be accessed on demand through the standard Local Area Network, with either wired or wireless connection. This allows convenient control from multiple user's computers without the need to install hardware specific drivers on each workstation. The system is optimized for data transfer (images, metadata and commands) at 100 MB/s over the Ethernet connection. A Web-based administration diagnostic, configuration and monitoring console is provided. Remote monitoring and control of multiple integrated fluorescence scanner units can be performed using one or more work stations through conventional Local Area Network infrastructure.

A manager user interface, provides general purpose functionality and tools for effective assay development. Acquisition protocols can be developed on conventional research microscopes with similar hardware capabilities (e.g. Nikon, Zeiss, etc.) and then executed on the scanner 100 without any changes. An SDK allows easy development of assay specific, custom applications and automation scripts. The SDK supports programming in ANSI C, C++, Java and any compatible scripting language. Interfaces for other programming languages such as C#/.NET or Python are also available. Once configured the integrated fluorescence scanner provides for autonomous execution of complex acquisition protocols and scripts without the need for continuing control from a workstation.

The software system for integrated fluorescence scanner 100 conforms to a client/server programming model where a server runs on the embedded computer inside the scanner while one or more client applications resides on user workstations. User's application (client) and the server on integrated fluorescence scanner 100 communicate through regular (wired Ethernet or wireless) Local Area Network, using both TCP/IP and UDP protocols. The software system automatically adapts to available network bandwidth. Typically integrated fluorescence scanner 100 can achieve sustained (live video streaming) rates of 100 MBytes/s on a regular Gigabit Ethernet wired connection, provided that both the integrated fluorescence scanner 100 and user's workstation are on the same LAN switch.

Figure 2A:
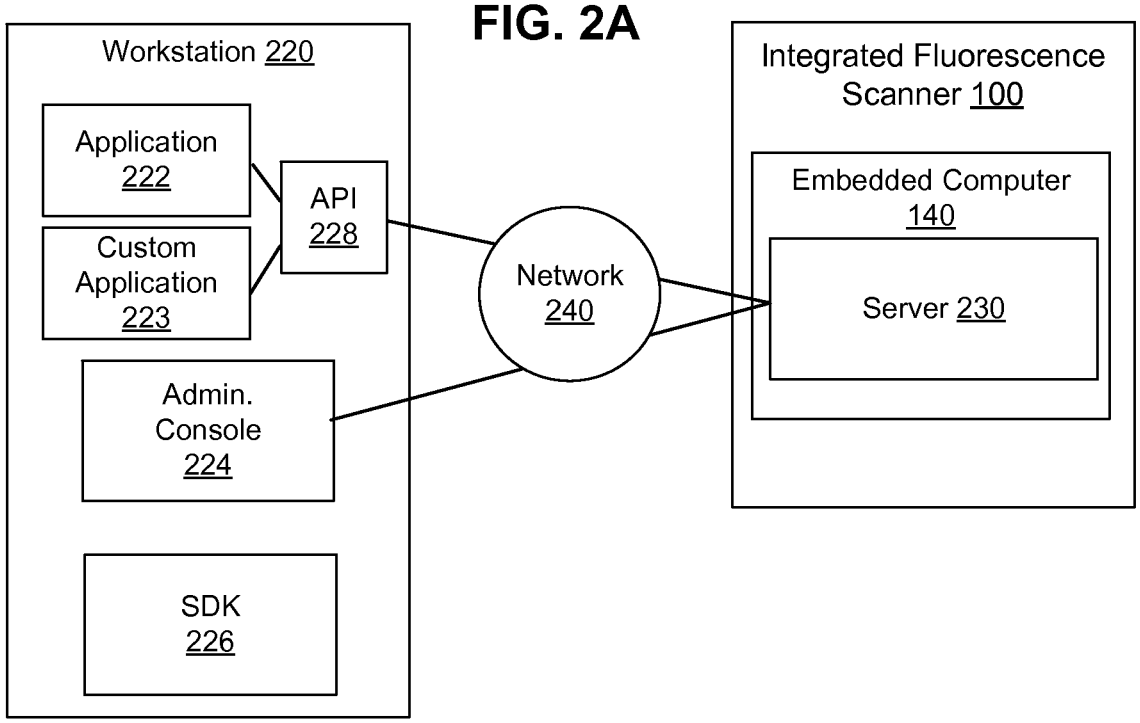
FIG. 2A shows an overview of the software of the integrated fluorescence scanner of FIG. 1A.

FIG. 2A shows an overview of the software of the integrated fluorescence scanner of FIG. 1A. FIG. 2A shows a user workstation 220 connected over a network 240 (LAN and/or WAN) to an integrated fluorescence scanner 100. Workstation 220 operates application 222 and an administrative web console 224. Workstation 220 may also be provided with Software Development Kit (SDK) 226. Typically however, applications will be developed by an administrator/developer rather than all system users. Integrated fluorescence scanner 100 operates sever software 230 on embedded computer 140. Note that although one workstation and integrated fluorescence scanner are shown, multiple workstations and integrated fluorescence scanner can be incorporated into a system connected by network 240.

Server 230 is preinstalled on each integrated fluorescence scanner 100 and runs autonomously on the embedded computer inside the scanner, which contains all drivers and core instrument control functions. Application 222 is a customized microscope control user interface software that can be installed on any number of user's computers for operating integrated fluorescence scanner 100. SDK 226 is a Software Development Kit software and documentation which allows a user to develop new, custom, assay specific applications for the integrated fluorescence scanner 100.

Server 230 is a software component runs on the embedded computer inside the integrated fluorescence scanner 100 and can be generally viewed as "firmware". The difference from the conventional firmware is that Server 230 runs on the general purpose computer equipped with an operating system and therefore allows much more flexibility, interaction with scientific cameras and higher degree of automation. However, it is similar to firmware in that it allows completely autonomous operation, of integrated fluorescence scanner 100. Once configured with a scanning protocol, integrated fluorescence scanner 100 can function without any connections to external computers.

Server 230 communicates with user applications and other external automation software through a single Gigabit Ethernet connection. It can transmit images, other data and receive commands at the combined rate of 100 MB/s. Server 230 automatically becomes active on power up of integrated fluorescence scanner 100, and automatically shuts down on power down. For diagnostic, configuration and monitoring, Server 230 provides a simple Web-based interface (Administration Console) which can be accessed from an authorized workstation.

Server 230 accepts and executes commands from Application 222 or other software and implements a full microscope control command set through an interface. Server 230 allows concurrent connection from multiple computers for monitoring and control purposes while also implementing lockdown during execution of acquisition protocols to avoid accidental interference. Server 230 can executes arbitrarily complex acquisition protocols completely autonomously, i.e. without the need to be connected to any user applications or external computers. Server 230 can store images and associated metadata can locally (on the embedded storage), shared network storage or user workstation. The destination (path) is specified by the acquisition protocol. The Server 230 never overwrites or deletes any previously acquired data, all naming conflicts are handled automatically. The server 230 supports multiple predefined hardware configurations, which can be switched on the fly without the need to power down.

Server 230 can also act as a lightweight Web server, listening for the HTTP requests, allowing administration and monitoring without installing any specific software at the user workstation. This a web-based administrative console 224 to be accessed from workstation 220 using a browser. Administrative console 224 provides the following functions: status display; commands for starting, stopping or restarting the server 230; options for automatic start on power up, or manual start; monitoring of images acquired by integrated fluorescence scanner 100; progress and status of the acquisition protocols currently executed by integrated fluorescence scanner 100; list of users currently connected to integrated fluorescence scanner 100; audit trail (log) of all actions performed by the scanner, with time/date and diagnostic information (log files with diagnostic information can be forwarded with support requests); and a list of available configurations (protocol switching) and configuration change commands for integrated fluorescence scanner 100.

Application 222 is a general purpose microscope control program which allows for control of all elements of integrated fluorescence scanner 100. The application 222 includes unique features for control of integrated fluorescence scanner 100. Application 222 provides for Ethernet connectivity so that it can talk to the Server 230 of integrated fluorescence scanner 100 to control the hardware of integrated fluorescence scanner 100. Application 222 provides for auto discovery of available scanners connected to Network 240. Application 222 provides the capability to upload acquisition protocols to integrated fluorescence scanner 100 and execute them autonomously, allowing the users to disconnect. Application 222 allows for remote monitoring of acquisition through the network.

Figure 2B:
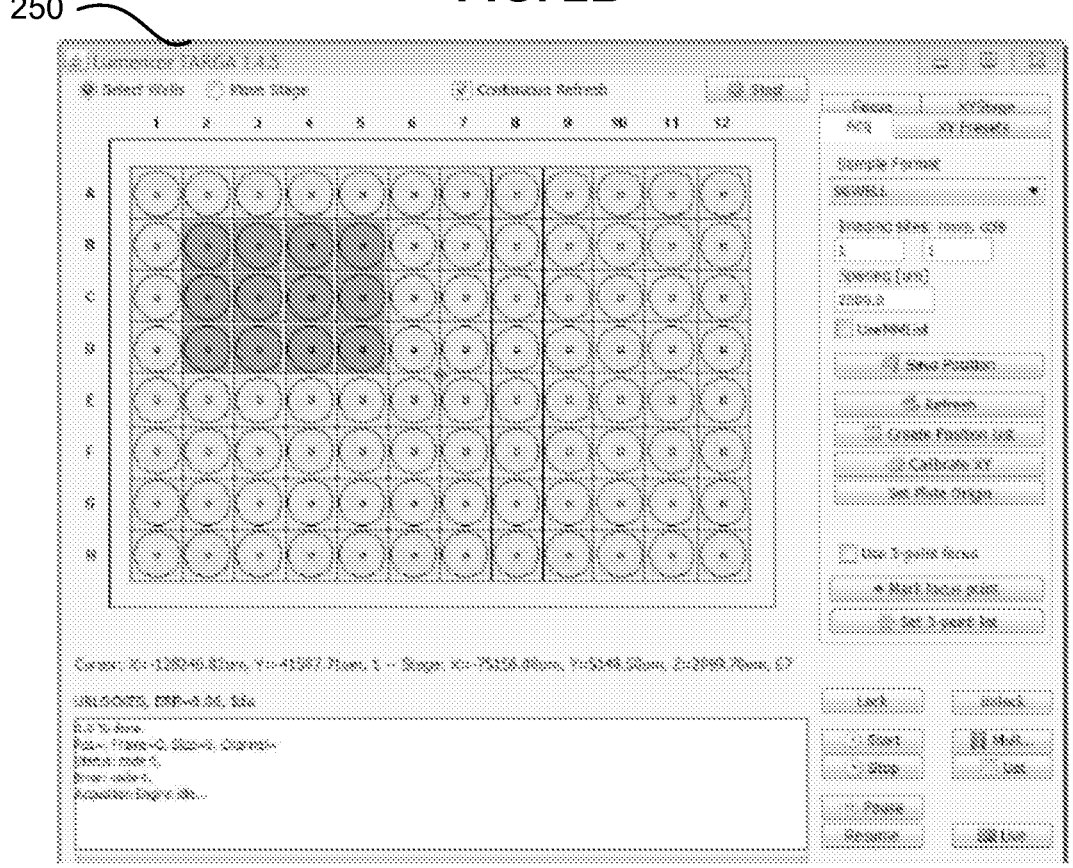
FIG. 2B shows an example of a user interface for controlling the integrated fluorescence scanner of FIG. 1A.

Application 222 also includes a user interface customized for integrated fluorescence scanner 100 which allows advanced XYZ navigation, multiwall plate scanning, and hardware autofocus. FIG. 2B shows an example of a user interface 250 which may be provided by application 222 for controlling the integrated fluorescence scanner 100. FIG. 2B illustrates an interface 250 for controlling XYZ navigation for a microplate which allows the application to establish navigation and scanning parameters for a microplate scanning protocol.

Software Development Kit (SDK) 226 allows users to build custom applications, e.g. custom application 223, and automation scripts for integrated fluorescence scanner 100. The SDK 226 provides a cross platform, programming language agnostic interface to all hardware features of the integrated fluorescence scanner 100. The SDK 226 supports C++; Java™, and Matlab™ on the Windows operating system. Other interfaces and languages can also be supported. The custom applications can be used to embody particular image acquisitions systems for a specific end-use application. The custom applications may be used instead of, or as well as, general purpose application 222.

Integrated fluorescence scanner 100 is programmatically controlled through Application Programming Interface (API) 228 which implements a model of the abstract automated microscope. The SDK 226 supports the process of creating custom applications using API 228 to control integrated fluorescence scanner 100. SDK 226 includes: C++ API DLL and associated header files; a Java API JAR (functions match C++ one-to-one); programming examples in C++ and Java; a scanner software which simulates the scanner to enable developing applications without access to scanner hardware; and instructional documentation.

A central component of the API 228 is a code class that encapsulates all hardware elements and functions of integrated fluorescence scanner 100. API 228 represents a high level abstraction for any combination of standard components used in automated digital microscopy. By using runtime configuration discovery features, a program can automatically determine whether hardware requirements for its execution are satisfied, e.g. if required devices are present and if they have required capabilities. The API 228 enables the program designer to build user interface or automation protocol in a device independent way and with minimal effort. The API provides implementations for most of the usual tasks that automated microscope is expected to perform in a laboratory or screening setting. The API can be configured to represent the components of integrated fluorescence scanner 100 as deployed in the end user's environment.

Figure 2C:
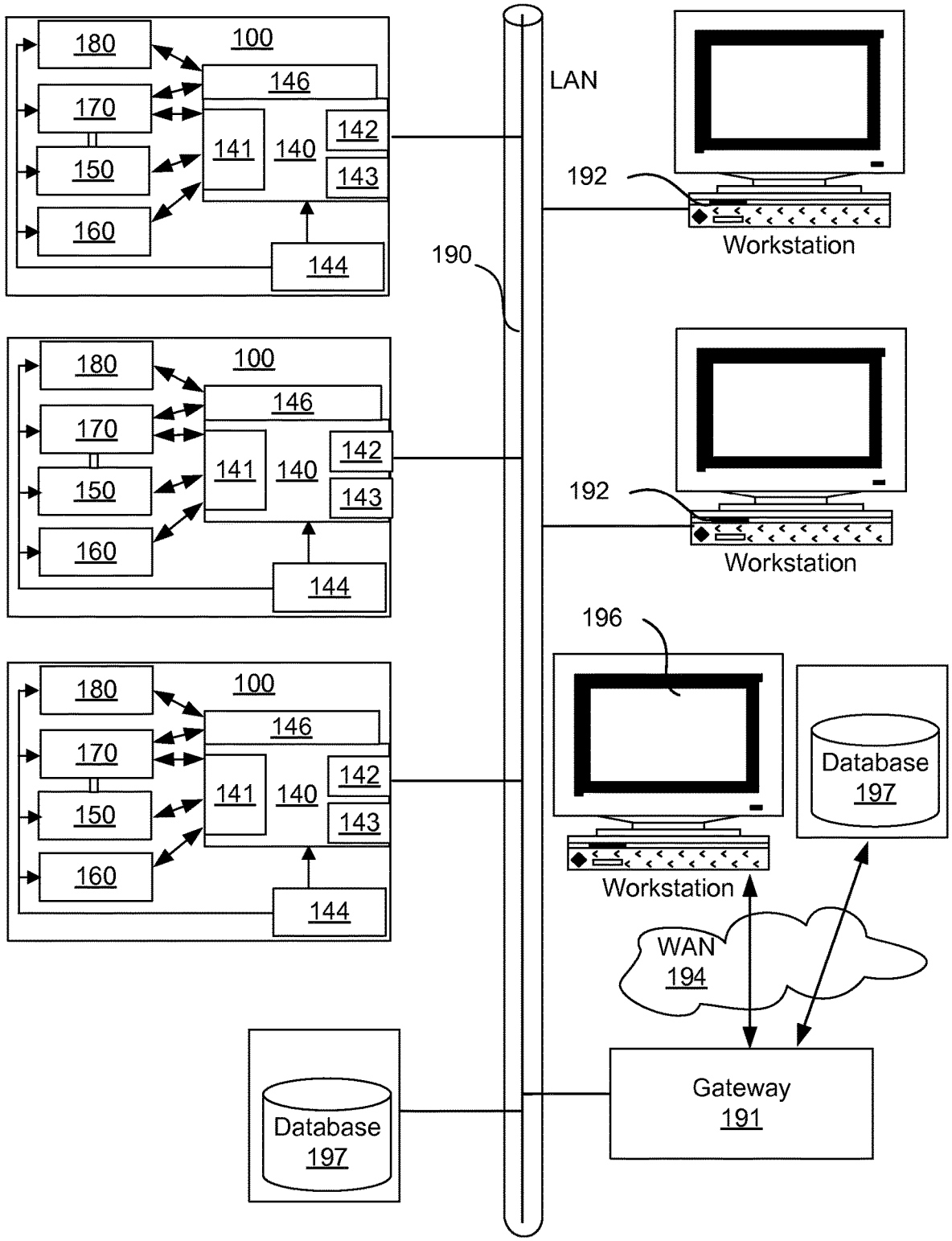
FIG. 2C shows a network diagram of a network including a plurality of integrated fluorescence scanners according to an embodiment of the present invention.
Figure 2D:
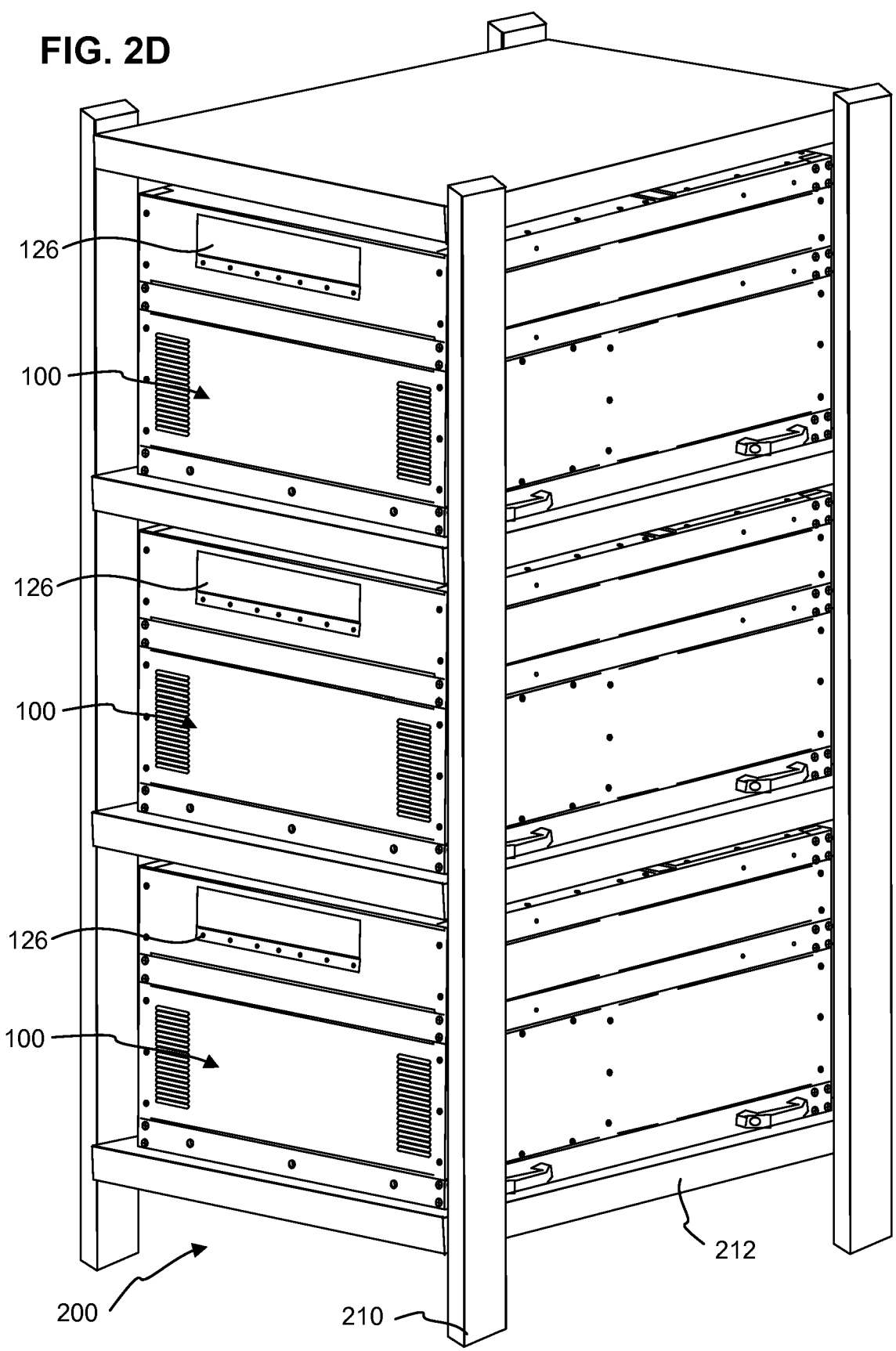
FIG. 2D shows a stack of multiple integrated fluorescence scanners according to an embodiment of the present invention.

FIGS. 2C and 2D illustrate systems having multiple integrated fluorescence scanners 100. As described above, integrated fluorescence scanner 100 is designed to be operated as a network appliance such that it can be connected to a network over which is receives configuration and scanning instructions and sends scanning results and performance data. Where high volume scanning is required multiple integrated fluorescence scanners 100 can be connected to a network. Electronic and software handshakes enable remote monitoring and reproducible, robust multi-scanner operation. The embedded computer provides a micromanager development interface for autonomous operation and remote control allowing scanner operation as a network appliance. The integrated fluorescence scanner facilitates synchronous multi-scanner operation and monitoring, robust, reproducible instrument/instrument and multisite operation via one control terminal with lights out factory operation. Automated calibration provides for inter and intra instrument consistency of results.

FIG. 2C shows a network diagram of a network including multiple integrated fluorescence scanners 100 according to an embodiment of the present invention arranged as a stack/rack 200. Advantageously, the integrated fluorescence scanners 100 can be provided in lab space and configured and controlled via workstations which may be inside or outside of the workspace or even located at a remote site. The integrated fluorescence scanner 100 operating as a network appliance can be viewed as providing a scanning service via the network to the workstations.

As shown in FIG. 2C, integrated fluorescence scanner 100 is designed to be operated as a network appliance such that it can be connected to a network over which is receives configuration and scanning instructions and sends scanning results and performance data. Embedded computers 140 can be connected via a Local Area Network (LAN) 190 to a local workstations 192 or via LAN 190, gateway 191, and Wide Area Network (WAN) 194 (e.g. the Internet or a private WAN) to a remote workstation 196. Embedded computer 140 can also be connected via LAN 190 to a server 196 having a database 197 for storing configuration and control instructions as well as scanning results. Alternatively, or additionally, a database 197 for storing configuration and control instructions as well as scanning results can be connected via Wide Area Network (WAN) 194 and gateway 191 to LAN 190 (e.g. "cloud storage"). Software applications provided on workstations 192, 196 allows users of workstations 192, 196 to configure integrated fluorescence scanner 100, control scanning operations of integrated fluorescence scanner 100, and view and analyze the scans produced by integrated fluorescence scanner 100 directly and/or using database(s) 197.

To facilitate installation of multiple integrated fluorescence scanners 100, each integrated fluorescence scanner 100 can be stacked or rack mounted. FIG. 2D shows a group 200 of multiple integrated fluorescence scanners 100 mounted in a rack 210 according to an embodiment of the invention. Each integrated fluorescence scanner can be secured to a shelf 212 of rack 210. The modular chassis is stackable to allow multiple units for ultra-high throughput. Integrated fluorescence scanner 100 is designed to prevent vibration interfering with the imaging system in order to allow for stacking/racking without the need for an air table. In an embodiment the system has a table top form factor 17 inch depth, 11 inch width, ×15 inch height, yielding a volume less than 2 cubic feet, and can be rack mounted with up to 3 units per rack.

Additionally, the scanner allows optional robotic access for sample introduction for repeatable slide placement. Stacked/racked units are arranged with specimen doors 126 facing a front work area for manual or robotic loading of specimens into the units. Connections for network and power on the rear side 106 of the racked/stacked units 100.

Thus, in an embodiment, a facility can utilize a high-throughput fluorescence scanning system which includes a plurality of integrated fluorescence scanners, wherein each integrated fluorescence scanner includes a solid state light engine, an epifluorescence microscope, a motion stage, an embedded computer which controls the solid state light engine, microscope and motion stage, and a network interface which allows for remote operation of the integrated fluorescence scanner as a network appliance; a workstation connected to each of the plurality of integrated fluorescence scanners by a network such that a user of the workstation is enabled to remotely operate all of the plurality of integrated fluorescence scanners. In embodiments, each integrated fluorescence scanner has a rack-mountable housing; and three of the integrated fluorescence scanners are supported by single rack.

Scanner Hardware Components

Figure 3C:
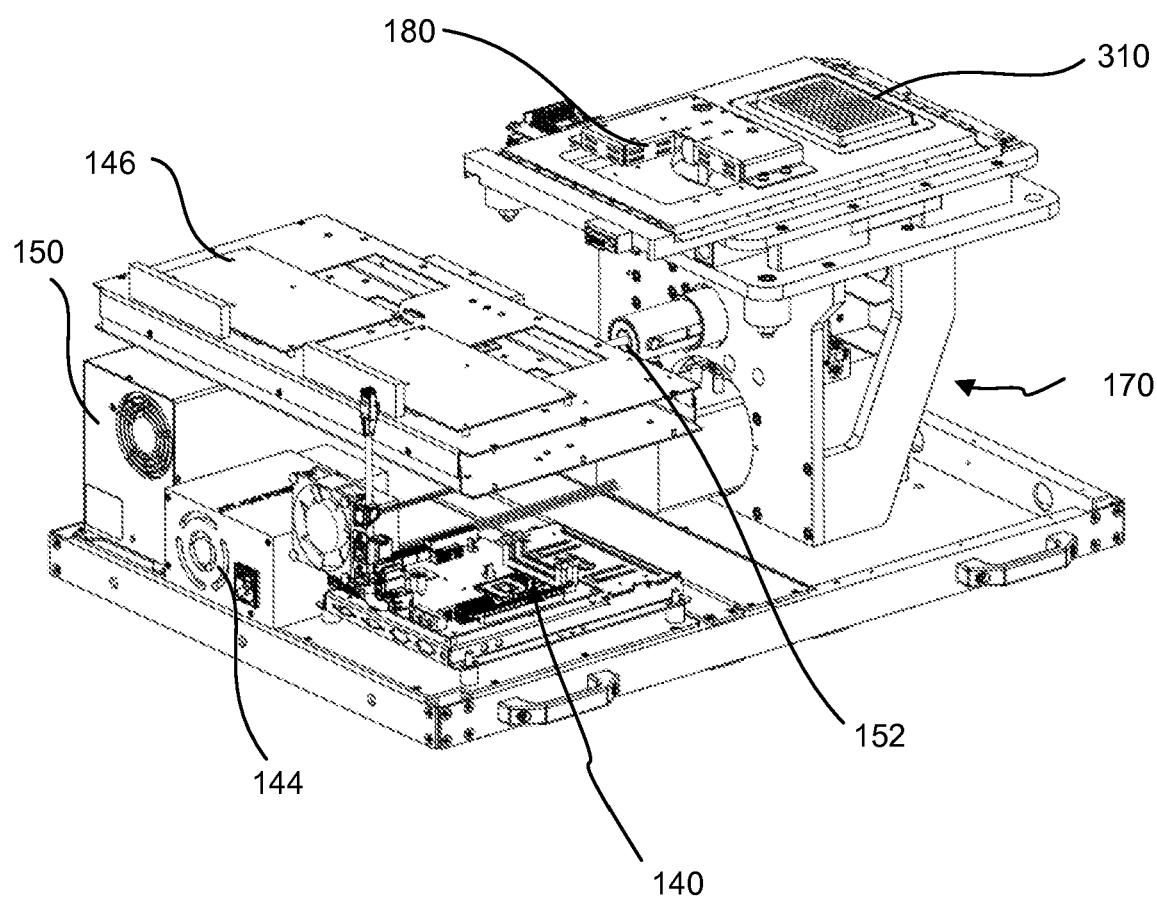

FIGS. 3A-3D show partial perspective views of the integrated fluorescence scanner 100 of FIGS. 1A-1C illustrating the arrangement of major components of the integrated fluorescence scanner according to an embodiment of the present invention. FIG. 3A shows a partial perspective view of integrated fluorescence scanner 100 with all panels except the bottom panel removed. FIG. 3A shows components of frame 112. Frame 112 is design to support the components of 1 fs 100 and to provide structural integrity to integrated fluorescence scanner 100 to allow stacking/racking. FIG. 3A shows the relative positions of motion stage 180, microscope 170, and light engine 150. Also shown in FIG. 3A are air ducts 302, 304 which allow air to pass from intake air vents 116 (see FIG. 1A) to the light engine 150 and embedded computer 140 respectively. Advantageously, air flow is controlled in order to reduce potential for airflow through the microscope 170 and potential contamination of the optical pathways. A microplate 310 is shown in position on motion stage 180. Thermal regulation can be performed and controlled by embedded computer 140 in response to e.g. temperature sensors in various components of the integrated fluorescence scanner 100.

FIGS. 3B and 3C show alternative partial perspective views of integrated fluorescence scanner 100 with portions of frame 112 removed and air ducts 302, 304 removed. FIG. 3A shows the relative positions of motion stage 180, microscope 170, light engine 150, embedded computer 140 and controller 146. FIG. 3B also shows the ends of light pipe 152 which transmits light from light engine 150 to microscope 170.

Integrated fluorescence scanner 100 includes a motion stage 180 and microscope 170. Microscope 170 is custom built for incorporation in integrated fluorescent scanner 100 and includes only those features and degrees of freedom necessary for operation in a fluorescence scanning application. The small form factor of the microscope 170 contributes to the small footprint and volume requirements of the integrated fluorescence scanner as a whole. The epifluorescent scope is in an inverted arrangement and hung from rigid frame directly connected to the frame of the integrated fluorescent scanner 100.

The microscope 170 includes autofocus capabilities, a tube lens and the collection optics to bring fluorescent signals to the camera. The microscope 170 include microscope objective mounts to mount up to three objective lenses by major manufacturers. A motorized objective changer allows for selection of which objective is used under control of the embedded computer. The objective lenses may be changed by the user through the access door 130. Plan apo 4×, 20× & 63× and tube lenses are used. An oiling system provides automated oil application for highest magnification objective. Manual oil refill and objective cleaning can be performed by the user. A hardware-based automated autofocus system focusses the objective lenses using reflection based hardware autofocus. Optical image based autofocus is also provided. Multiple position dichroic/emission pairs are provided in a filter block holder. The filter blocks can be manually loaded. An actuator under control of the embedded computer allows for selection of the filter block in use at any point in time. A protocol switch allows change of dichroic/emitter pairs.

Figure 4C:
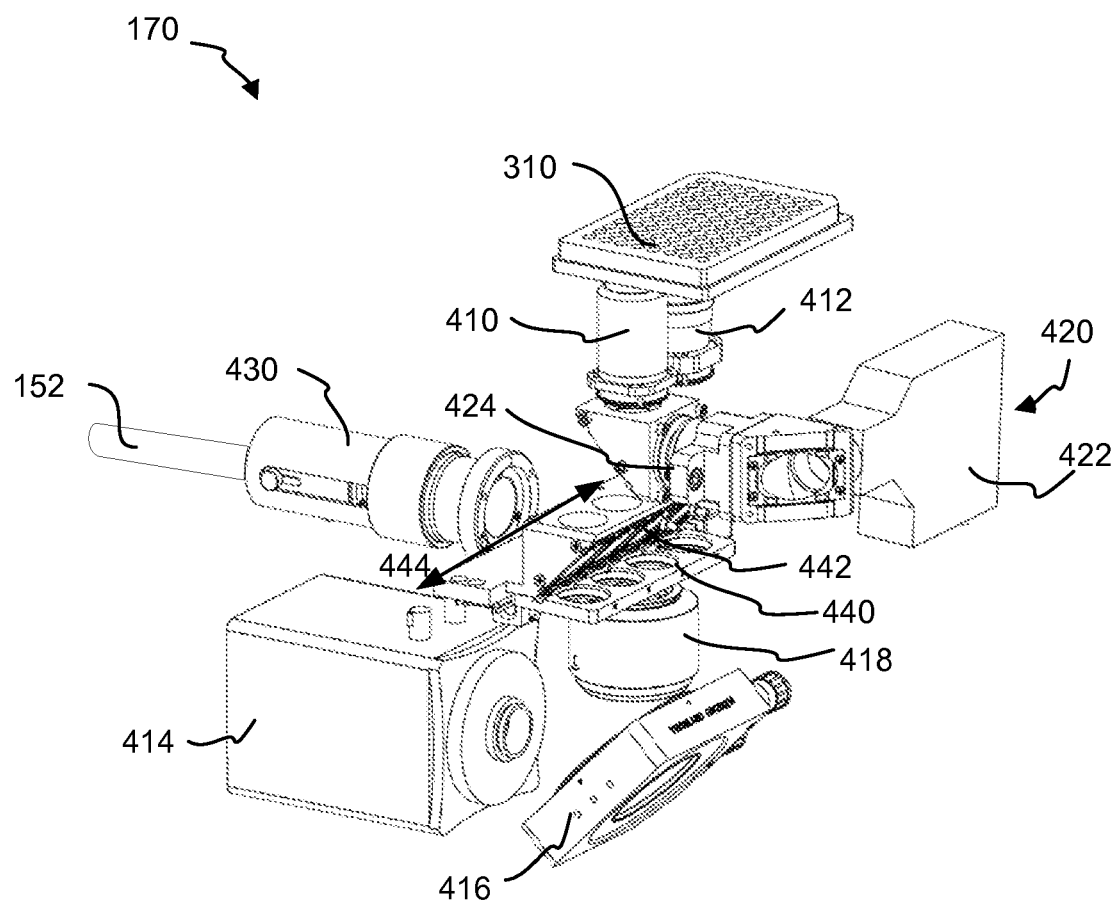

FIGS. 4A-4C show partial perspective views of the motion stage 180 and microscope 170 of the integrated fluorescence scanner 100 of FIGS. 1A-1C according to an embodiment of the present invention. FIG. 4A shows motion stage 180 mounted above microscope 170. Motion stage 180 is designed to hold specimens such as micro-titer plate 310 or four standard slides. Different inserts 406 to motion stage 180 can be created to allow the use of alternative specimen holders and configurations. Motion stage 180 also includes an oiling system 407 for applying oil to the objective lenses 410, 412.

Motion stage 180 comprises actuators driven by controller 146 under the control of embedded computer 140. Motion stage 180 is configured to move the specimen in the horizontal plane as shown by arrows 402, 404 in order to bring different portions of the specimen into the imaging area of the microscope. Movement of stage along axis 402 can also be used to move the sample in and out of specimen door 126 to allow for loading and unloading of specimens. Motion stage 180 is mounted to microscope 170 using vibration isolating mounts 408 (one is shown) in order to reduce transmission of vibrations caused by movement of motion stage 180 to the microscope 170 and the remainder of integrated fluorescence scanner 100.

FIG. 4B shows the same view as FIG. 4A, however motion stage 180 has been removed to reveal further detail of microscope 170. As shown in FIG. 4B two objective lenses 410, 420 of microscope 170 are positioned below microplate 310. Light is supplied through objective lenses 410, 412 to the specimen(s) in microplate 310. Light is then received from the specimens in microplate 310 through objective lenses 410, 420 and passed to camera 414. The objective lenses are mounted to an autochanger 450 which allows the objective (and hence the magnification) to be changed under the control of embedded computer 140 and controller 146. The autochanger includes a z-axis actuator for each objective lens 410, 412 in order to allow focusing of lenses 410, 412 by autofocus system 420. The autochanger 450 allows mounting of objective lenses made by major manufacturers including Zeiss, Nikon and Olympus.

FIG. 4C shows a partial perspective view of the optical components of microscope 170—the microscope structural members and supports for motion stage 180 have been removed. As shown in FIG. 4B two objective lenses 410, 412 of microscope 170 are positioned below microplate 310. Two different objective lenses 410, 412 may be used to provide different magnifications. Light is supplied through objective lenses 410, 412 to the specimen(s) in microplate 310. Light is then received from the specimens in microplate 310 through objective lenses 410, 420 and passed to cameras 414.

Light engine 150 provides light through light pipe 152 to collimator 430. Collimator 430 collimates the light from light engine 150 and directs the light toward filter block 440. Filter block holder 440 includes four dichroic filter blocks 442 and an actuator which can select which filter block 442 is paced in the light path between collimator 430 and objective lens 420. The actuator moves filter block holder 440 as shown by arrow 444 to place the desired filter block 442 in the optical pathway between collimator 430 and camera 414 and the selected objective lens 410 or 412. The actuator of filter block holder 440 is under the control of embedded computer 140 and controller 146. Filter blocks 442 include optimized dichroic and emission filters selected for reflecting selected wavelengths of light from light engine 150 to objective lens 420 and transmitting selected wavelengths of light to camera 414. A light trap (not shown) is used to trap light from light engine 150 which is not reflected towards the objective lenses 410, 412. Camera 414 receives light after transmission through filter block 440 via tube lens 418 and an aluminum first surface mirror 416. Selection of different filters in the filter block allows for imaging in four different color channels.

The integrated fluorescence scanner can include a range of optional cameras for imaging. The scanner provides for precision angular rotation: alignment of camera axis & stage motion. Programmed Light engine and camera triggering can be controlled under control of the embedded computer. A 15×15 mm area (70×70 fields) can be imaged in four channels. Auto IR reflective focus mechanism allows for <1% field loss, >200 nm out. The exposure rate can be 30-50 frames per second up to a potential output of 100 frames per second. In a preferred embodiment camera 414 is a large chip sCMOS camera. The camera includes a large chip area: 2 k square image sensor providing a resolution <1.3× theoretical PSF, center and corner characterizations. Field flatness is <200 nm focal separation center to corner. Intensity roll off is <20% corner to center. Chromatic aberration is less than 2-3 pixel shift between fluorophores at corner of image. Software correction provides <1 pixel chromatic error. Suitable cameras include, for example, a large chip sCMOS cameras made by Hamamatsu™ or Andor™.

Microscope 170 also includes an autofocus system 420. Autofocus system 420 is used to focus objective lenses 410, 412 in the correct imaging plane for specimens such as specimens in microplate 310. In a preferred embodiment the autofocus system includes an imager 422 which includes an 850 nm LED illumination source with an 850 nm LED cleanup filter. An 800 nm dichroic 424 is used to transmit light to the specimen and back to the imager 422 through an 800 nm filter. The autofocus system uses the LED light source to project an image of a mask onto the sample. The imager analyzes a received image of the mask to generate focus information which is then used to focus the objective lenses. The autofocus system integrates with piezo-Z or motorized focus stages in order to automatically focus the objective lenses. A suitable autofocus system includes the CRISP™ autofocus system available from Applied Scientific Instrumentation of Eugene Oregon.

Light Engine

Integrated fluorescence scanner 100 requires a high intensity light source producing light of wavelengths required for the particular scanning application. Wavelengths are typically selected to excite particular fluorophores used to label samples of interest. Many conventional scanning systems utilize arc lamps as flexible broad band sources of white light. The light output is modulated with numerous optical elements, to select for the wavelengths of interest and, for typical fluorescence based instruments, to discriminate against the emission bands. However the notorious instability, lack of durability, and service requirements of arc lamps, in addition to their significant heat management requirements make them unsuitable for an integrated scanner.

LED light sources provide greater durability and reduced heat management requirements making a LED light source preferable for an integrated scanner. LEDs are now available in a relatively wide range of wavelengths. However output in the visible spectrum is profoundly reduced in the green wavelengths 500-600 nm. LEDs also presents trade-offs with respect to emission wavelength dependent intensity, broad emission spectrum (spectral half width on the order of 30 nm or more) and poor spectral stability. Finally, LED's generate light over a wide angular range (50% of light intensity emitted at 70°). While optics can narrow the emission band and focus the light output, the result is reduced useful power and increased thermal output. Thus, creating an LED light source having the required optical output attributes, a compact size, and good thermal management for use in an integrated fluorescence scanner is difficult.

Integrated fluorescence scanner 100 includes a solid state light engine 150 which provides light to the microscope under control of the embedded computer. The light engine is swappable for repair, replacement of substation with alight engine having different capabilities. The light engine provides as many as eight excitation colors with exchangeable filters including as many as seven UV Visible light color bands and one optional NIR band. The light engine also provides optional metered dosage closed loop control. A dosimetry option allows titration of photons per analysis (light as a reagent) and can be operated in constant power mode or constant flux mode. The light engine features an electronic shutter, ~5-20 μs pulse rise or fall times and a modulation rate up to 5 kHz.

FIGS. 5A-5D show views of the light engine 150 of the integrated fluorescence scanner of FIGS. 1A-1C according to an embodiment of the present invention. The light engine includes multiple solid state light sources operating simultaneously to generate mixed light output or operating sequentially to provide separate light outputs to provide light of a desired spectral distribution for a particular protocol or stage of a protocol. When generating white light, the light engine 150 generates white light which is continuous in the visible spectrum from 380 nm to 650 nm, has a high color rendering index, and is suitable for microscopic and endoscopic imaging.

Features of the solid state illumination system include: powerful white light for high-definition (HD) visible illumination and imaging; controllable color spectrum for high contrast imaging matched to color cameras; narrowband light for indocyanin green (ICG) excitation, endogenous fluorescence, other imaging agents; simultaneous illumination of white light and fluorescence images; spectral stability (<1% drift, usage dependent) & power stability (5 kHz with turn on/off ~10 μs); illumination uniformity; microsecond switching with no filters or shutters (≥5 kHz modulation, ≤6 μs rise time, ≤20 μs fall time); minimal heat generation; computer control; long life >10,000 hours with no consumable parts; short warm up time (1-10 minutes); and a compact size (9×18×23 cm) for off-the-shelf and custom OEM configurations. Options include a customizable Wavelength range tailorable from visible to NIR; customizable maximum and minimum light optical power per application; customizable optical interface adapted e.g. for optical fibers, fiber bundles, liquid light guides; customizable complete computer control interface; and a dosimeter for real-time instantaneous power monitoring. The computer control interface is connected to the embedded computer of the scanner. Light output is thereby be controlled and synchronized with imaging operations in the microscope and cameras under the control of the embedded computer.

In a preferred embodiment the total optical output power is approximately 2.5 W. Advantageously, the spectral power of the light engine 150 is equal to or greater than the spectral power of a 120 W metal halide lamp or 150 W Xenon lamp across substantially the entire visible spectrum from 380 nm to 650 nm. If needed, the user can utilize a broad range of commercially available filters. This provides the most flexibility to the user in utilizing the light output. The light engine 150 includes an adapter for coupling the output of light engine 150 into the light guide 152 for transmission to the microscope of the integrated fluorescence scanner.

The cooling requirements for a solid state illumination system are substantially different than that for an incandescent light source. Incandescent lights typically release 90% or so of the heat they generate to their environment through radiation in the infrared and less than 10% through conduction. In comparison, LEDs typically release 90% or so of the heat they generate to their environment through conduction and less than 10% through conduction. Thermal dissipation is a key factor that limits the power output of an LED light source. Even though LEDs bulbs are considerably more efficient at converting electrical energy into light than incandescent light sources, but the LED components and the driver electronics can still create a considerable amount of heat. If this heat is not dissipated properly, the LED's quality of light, emission spectra, and life expectancy decrease dramatically. Thus, it is important in a solid state illumination system relying on LEDs to provide a solution for conductive cooling of the LEDs. This is of high importance in the integrated fluorescence scanner where undue heat build-up in the housing with interfere with reliability of the system and imaging results.

Figure 5C:
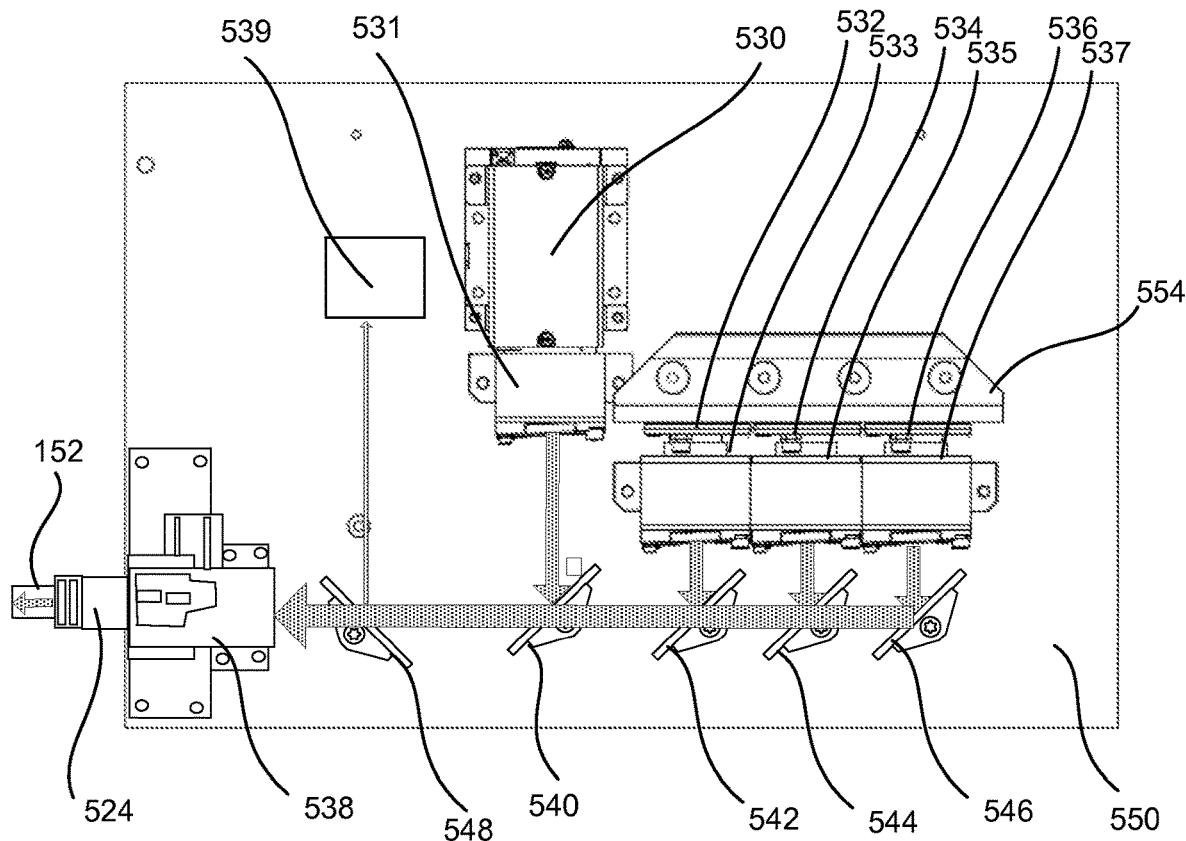
Figure 5D:
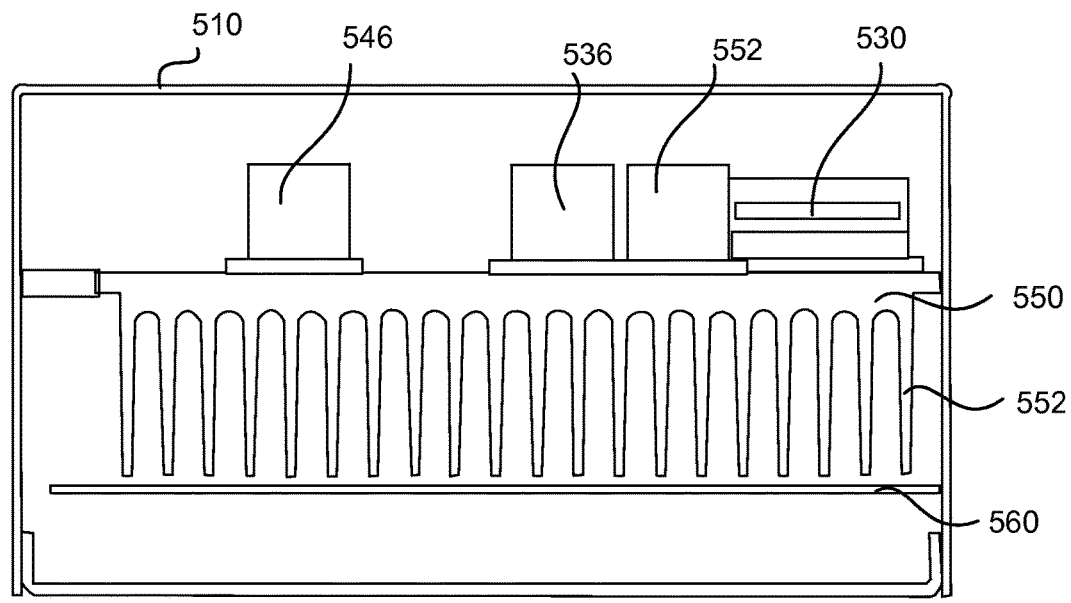

Referring first to FIGS. 5A and 5B which show exterior perspective views of light engine 150. Light engine 150 is enclosed by a housing 510 which protects the light engine 150 and substantially prevents the entry/exit of light, and air except as provided. A cooling intake 512 on the front of light engine 150 allows for intake of air from air duct 302. An adapter 524 accepts a light guide 152 which may be a liquid light guide or fiber optic light guide. A power switch 520 and control port 522 are also provided on the front of housing 510. As shown in FIG. 5B, the back of light engine 150 has a fan exhaust port 514 which the cooling air exits the light engine 150. The fan exhaust is arranged such that it also expels the air through a vent in the housing of the scanner after integration of the light engine into the scanner FIG. 5C, shows an internal plan view of the light engine 150 with the housing 510 removed. As shown in FIG. 5C, the interior of light engine 150 includes a platform 550 the top surface of which is substantially flat and supports the solid state light sources and associated optics. As shown in FIG. 5D the bottom surface of platform 550 bears a plurality of fins 552 which provide a large surface area for the cooling of platform 550. The fins are arranged parallel to the axis of the air flow from the front to the back of light engine 150. Platform 550, maintains the cooling air flow from fans in the portion of housing 510 between and platform 550. This prevents air flow around the solid state light sources and associated optics reducing the possibility of contamination of the optical components. A control board 560 sits between platform 550 and housing 510 such that it also receives cooling air flow from fans. Control board 560 includes the circuitry for driving the solid state light sources, shutter and sensors of solid light engine 150.

Referring again to FIG. 5C which shows the non-finned side of platform 550 to which the optical components are mounted. FIG. 5C shows the layout of the solid state light sources and associated optics on platform 550. As shown, light engine 150 includes four solid state light source which include a light pipe engine 530, and three LED light sources 532, 534, and 536. The light pipe engine 530 and three LED light sources 532, 534, and 536 emit non-coherent light of different colors. Each of the light sources includes a collimator 531, 533, 535, and 537 which forms the light output from the source into a collimated beam. Each of the light sources is aligned with a dichroic mirror 540, 542, 544, and 546 at which the collimated light beam is directed. The dichroic mirrors 540, 542, 544, and 546 are aligned so as to combine the collimated beams onto a single optical axis generating a combined coaxial beam aligned with output optics 538. Output optics 538 focus the combined beam into light guide 152 positioned within adapter 524. Light guide 152 transmits the combined beam to microscope 170.

Light engine 150 can also optionally include a beam splitter 548 which reflects a portion of the output beam onto photodiode 539 for quantifying the output beam. A light-to-frequency converter converts the detector output to a pulse train, the frequency of which is proportional to the light flux. A microprocessor-based counter on control board 560 counts the pulse train, for each color, and compares the ongoing count to the reference count or preset dosage for each color (controlled by embedded computer 140). When the counter reaches the reference count, it disables the color channel currently provided by the light engine 150. Another trigger is sent to the camera, ending the current exposure period. Quantifying the output beam provides optional metered dosage closed loop control. A dosimetry option allows titration of photons per analysis (light as a reagent) and the light engine 150 can be operated in constant power mode or constant flux mode. The dosimetry option provides for metered dosage illumination in the integrated fluorescence scanner 100. The dosimetry-enable light engine can provide optimized amounts of excitation light within the short exposure times necessary to measure fast biological activity. The amount of light can be precisely measured to provide quantitative results. The light flux can also be precisely controlled to generate only a prescribed minimum amount of light, in order to reduce adverse lighting effects such as photo bleaching on both fluorophores and samples.

Light pipe engine 530, three LED light sources 532, 534, and 536 are selected to provide different color components of the spectral content of the light output. In a preferred embodiment the three LED light sources 532, 534, and 536 and light pipe engine 530 each produce a different color component of the continuous light output. The output wavelengths of the sources overlap and combine to some extent contributing the overall spectral output of the light engine 152. The LED light sources and the light pipe engine are controlled by the controller board 560 either together or individually to control the spectral content of the output beam. Controller board 560 communicates with embedded computer 140 such that embedded computer of the scanner can control color, timing intensity and other variables for the output beam as required for the microscope 170 and cameras.

In embodiments the light pipe engine 530 and three LED light sources 532, 534, and 536 can produce spectral components centered on colors violet 395 nm, blue 425-460 nm, cyan 460-500 nm, teal 515 nm, green 500-615 nm, and red/orange 615-685 nm depending on the wavelengths required by integrated fluorescence scanner 100. All of light pipe engine 530 and three LED light sources 532, 534, and 536 can be turned on at the same time such that the different colors are combined to create a substantially continuous white light having a high color rendering index (CRI). Alternatively, light pipe engine 530 and three LED light sources 532, 534, and 536 can be turned on individually such that different colors of light are provided in the output beam at different times. In a preferred embodiment light pipe engine 530 is used to generate high intensity green (green and yellow) light spanning 500-600 nm. Light pipe engine 530 and LED light sources 532, 534, 536 are under control of the embedded computer of integrated fluorescence scanner 100 such that the provision of light to the microscope can be coordinated with imaging operations according to a particular imaging protocol.

In the light engine 150 each of the solid state light sources including light pipe engine 530, three LED light sources 532, 534, and 536 is in thermal contact with platform 550. The thermal contact is direct metal to metal contact or may be mediated by a thermal paste between the solid state light source and the platform 550. Platform 550 is made from a conductive metal/metal alloy such that head from the solid state light sources is rapidly conducted away towards fins 552 which are provided with cooling air flow. Thus platform 550 serves both as an optical table for mounting and aligning the solid state light sources, mirrors and output optics as well as a common heat sinks for the solid state light sources including light pipe engine 530 and three LED light sources 532, 534, and 536. The solid state light sources are suitably designed to efficiently transmit heat from their components to the platform 550. The light engine is position to receive cooling air from the cooling systems of integrated fluorescence scanner 100 as described above such that cooling air is received through a duct and heated air is expelled outside the housing of the scanner through a vent. This avoids overheating the interior of the housing of the scanner.

Additional details of light engines 150 (and solid state light source components of same) suitable for use in integrated fluorescence scanner 100 are disclosed in U.S. Pat. No. 8,466,436 entitled "System and Method For Metered Dosage Illumination In A Bioanalysis Or Other System" to Jaffe et al.; U.S. Pat. No. 8,967,811 entitled "Solid State Continuous White Light Source" to Jaffe et al.; U.S. Pat. No. 8,998,468 entitled "Solid State Light Source With Hybrid Optical And Electrical Intensity Control" to Jaffe et al.; U.S. Publication No. US 2014-0192405 entitled "Adjustable Collimator For Coupling A Light Guide To A Microscope" to Jaffe et al., all of which applications are incorporated herein by reference. Such light engines may be modified in accordance with the above description to be suitable for integration into integrated fluorescence scanner 100. In alternative embodiments, light engine 150 may include additional light pipe engines, LED light sources and/or coherent/laser light sources as required for particular fluorescent scanning applications intended for integrated fluorescence scanner 100. Light engine 150 is also designed such that it may be removed from integrated fluorescence scanner 100 for repair, replacement or substitution for a light engine having different spectral output.

EXAMPLES

Figure 6A:
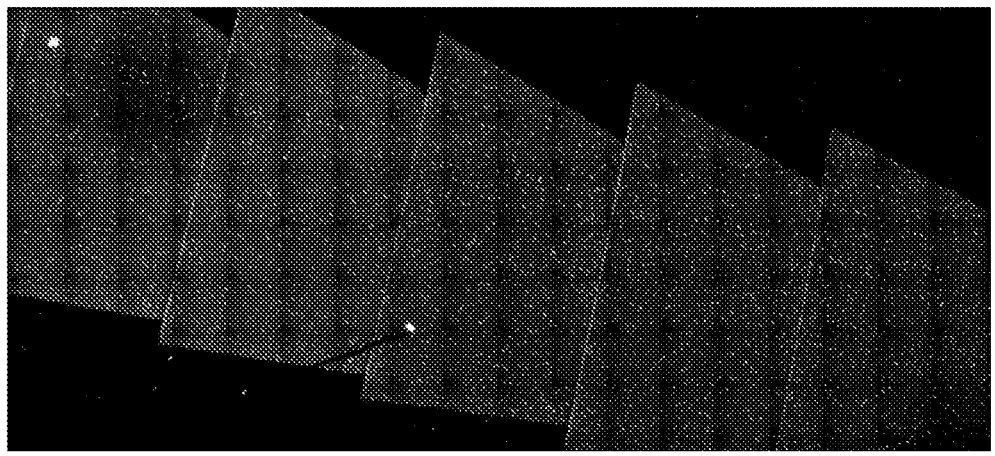
FIGS. 6A and 6B show examples of fluorescence scanning results obtained using a prototype of the integrated fluorescence scanner of FIGS. 1A-1C.
Figure 6B:
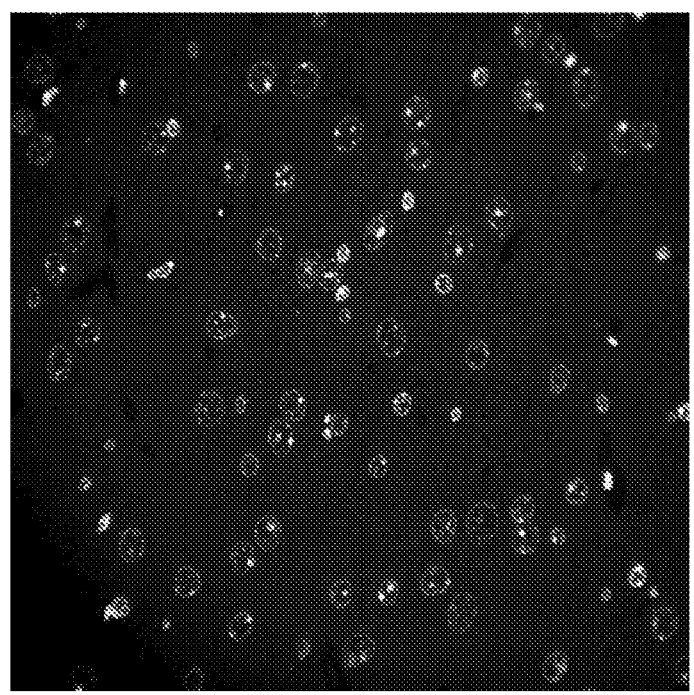

FIGS. 6A and 6B show examples of scanning results obtained using a prototype of the integrated fluorescence scanner of FIGS. 1A-1C. FIG. 6A shows a fluorescence scanning image of an array of thin sections of mouse brain tissue laid out on a slide. The tissue is stained with DAPI fluorophore excited with UV light from the light engine and imaged in blue light at the camera. The resultant image is 35504×19639 pixels with, 16 bits per pixel intensity data comprising a 16×9 grid (162 tiles). FIG. 6B shows an array tomography image of mouse brain tissue on a slide. The image is 2048×2048 pixels with 16 bits per pixel. The camera used was A Hamamatsu™ Flash 4. A 60×1.4 NA objective was used with oil immersion. The dimension of 1 pixel is 108 nm.

The foregoing description of the various embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

The scanner, scanner software, illumination systems and components thereof described herein may, with suitable adaptation, find application in a range of applications including: life science applications which cover a range of white light and/or fluorescence analyses and quantitation; microscopy; fluorescence microscopy; high content screening; genetic expression analysis; digital pathology; and endoscopy.

Other features, aspects and objects of the invention can be obtained from a review of the figures and the claims. It is to be understood that other embodiments of the invention can be developed and fall within the spirit and scope of the invention and claims.

What is claimed is:

1. An integrated fluorescence scanner comprising:
   a housing comprising a frame;
   a solid state light engine mounted to the frame within the housing;
   an epifluorescence microscope, the microscope including a support mounted to the frame with the housing;
   a motion stage mounted to the top of the microscope support using a plurality of vibration isolation mounts, whereby both the frame and the microscope are isolated from vibration caused by movement of the motion stage, and wherein the motion stage is configured to hold a sample above the microscope and move the sample relative to the microscope during a scanning operation;
   an embedded computer which controls the solid state light engine, microscope and motion stage; and
   the embedded computer having a network interface which allows for remote operation of the integrated fluorescence scanner as a network appliance;
   wherein the motion stage is further configured to receive different inserts for holding four standard microscope slides or a microplate.

2. The integrated fluorescence scanner of claim 1, wherein:
   the embedded computer is configured to permit autonomous operation of the integrated fluorescence scanner.

3. The integrated fluorescence scanner of claim 1, further comprising:

a housing enclosing the solid state light engine, embedded computer, epifluorescence microscope, and motion stage wherein the housing has a volume no greater than 2 cubic feet.

4. The integrated fluorescence scanner of claim 3, further comprising:
a single power supply located within the housing which supplies power to the solid state light engine; epifluorescence microscope; motion stage; and embedded computer.

5. The integrated fluorescence scanner of claim 1, further comprising:
a server installed on said embedded computer wherein the server is configured to communicate with computer workstations over a network; and
wherein said server is also configured to operate said integrated fluorescence scanner to perform scanning operations autonomously when not in communication with a computer workstation.

6. The integrated fluorescence scanner of claim 1, wherein said solid state light engine comprises:
a plurality of led light sources under control of the embedded computer for providing light of selected wavelengths to said epifluorescence microscope.

7. The integrated fluorescence scanner of claim 1, wherein said solid state light engine comprises:
a plurality of led light sources and at least one light pipe light source under control of the embedded computer for providing light of selected wavelengths to said epifluorescence microscope.

8. The integrated fluorescence scanner of claim 1, further comprising:
a filter block comprising a plurality of dichroic/emission pairs; and
an actuator under control of said embedded computer for moving said filter block to select one of said plurality of dichroic/emission pairs for use in a scanning operation.

9. The integrated fluorescence scanner of claim 1, wherein said epifluorescence microscope comprises two objective lenses for imaging samples and an autofocus system for focusing said lenses on said samples.

10. The integrated fluorescence scanner of claim 1, wherein said epifluorescence microscope comprises a camera for generating images of samples wherein said camera is under control of said embedded computer.

11. The integrated fluorescence scanner of claim 10, wherein said embedded computer comprises a storage system configured to store image data generated by said camera; wherein said storage system includes one or more of a hard-drive and a solid-state drive.

12. A fluorescence scanning system comprising:
a rack having a first station and a second station;
a first integrated fluorescence scanner according to claim 1, mounted to the first station of the rack;
a second integrated fluorescence scanner according to claim 1, mounted to the second station of the rack.

13. The fluorescence scanning system of claim 12, wherein the second integrated fluorescence scanner is isolated from vibration caused by movement of the motion stage of the first integrated fluorescence scanner.

14. The integrated fluorescence scanner of claim 12, wherein the integrated fluorescence scanners are arranged facing a front work area for manual or robotic loading of specimens into the scanners.

15. The integrated fluorescence scanner of claim 1, further comprising a rack having a vertical series of shelves, wherein the fluorescence scanner is configured to be interchangeably received on and mounted to any of the shelves of the vertical series.

16. The integrated fluorescence scanner of claim 1, further comprising an oiling system configured to provide automated application of oil to an objective lens of the microscope.

17. The integrated fluorescence scanner of claim 1, further comprising an image-based autofocusing system including an illumination source configured to project an image of a mask onto the sample, and an imager to detect the image of the mask.

18. The integrated fluorescence scanner of claim 1, further comprising a first air duct that allows air to pass from a first intake vent of the housing to the light engine, and a second air duct that allows air to pass from a second intake vent of the housing to the embedded computer.

19. The integrated fluorescence scanner of claim 1 wherein the light engine includes a beam splitter and a photodiode to quantify an output beam from the light engine.

20. An integrated fluorescence scanner comprising:
a housing comprising a frame;
a solid state light engine mounted to the frame within the housing;
an epifluorescence microscope, the microscope including a support mounted to the frame with the housing;
a camera;
a motion stage mounted to the top of the microscope support using a plurality of vibration isolation mounts, whereby both the frame and the microscope are isolated from vibration caused by movement of the motion stage, and wherein the motion stage is configured to hold a sample above the microscope and move the sample relative to the microscope during a scanning operation;
an embedded computer which controls the solid state light engine, camera, microscope and motion stage wherein the embedded computer is configured to permit autonomous operation of the integrated fluorescence scanner;
a housing enclosing the solid state light engine, embedded computer, epifluorescence microscope, camera, and motion stage wherein the housing has a volume no greater than 2 cubic feet; and
a single power supply located within the housing which supplies power to the solid state light engine; epifluorescence microscope; motion stage; camera, and embedded computer;
wherein the motion stage is further configured to receive different inserts for holding four standard microscope slides or a microplate.

* * * * *